Figure 1:
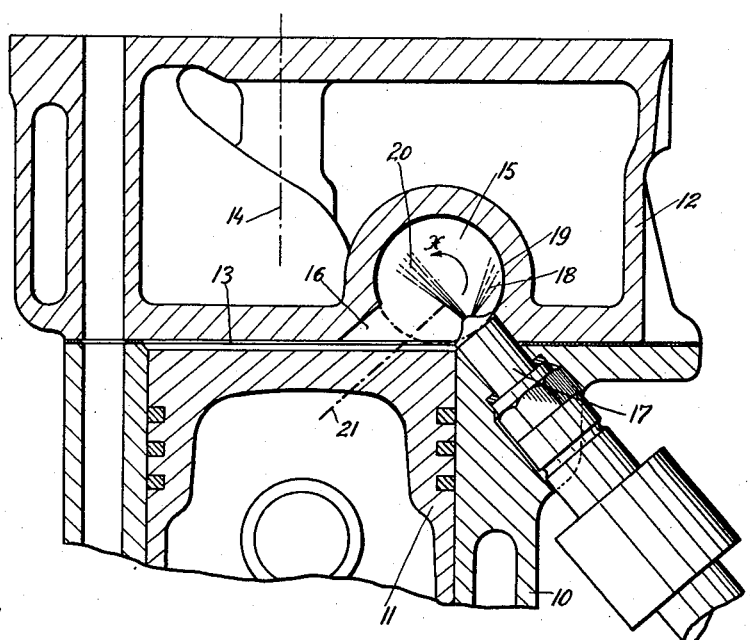

Nov. 4, 1958 H. HOFFMANN 2,858,810
INTERNAL COMBUSTION ENGINE OF THE DIESEL TYPE
Filed March 22, 1955

Inventor
HEINRICH HOFFMANN
BY Dicke and Craig
ATTORNEYS.

2,858,810

Patented Nov. 4, 1958

United States Patent Office

2,858,810

INTERNAL COMBUSTION ENGINE OF THE DIESEL TYPE

Heinrich Hoffmann, Stuttgart-Unterturkheim, Germany, assignor to Daimler-Benz Aktiengesellschaft, Stuttgart-Unterturkheim, Germany Application March 22, 1955, Serial No. 496,000

Claims priority, application Germany March 27, 1954

5 Claims. (Cl. 123—32)

My invention relates to an internal combustion engine of the diesel type in which the fuel is injected into a vortex of compressed air, and it is the object of the present invention to so correlate and organize the various elements of the engine as to secure a high efficiency and a smooth operation of the engine.

Further objects of my invention will appear from a detailed description of a number of embodiments thereof following hereinafter and the features of novelty will be pointed out in the claims. I wish it to be clearly understood, however, that such detailed description serves the purpose of illustrating the invention rather than that of restricting the same. In the drawings, Fig. 1 represents an axial section through the upper part of a cylinder, the cylinder head and the piston, the fuel injection nozzle being shown in elevation, Fig. 2 is a sectional view similar to a part of Fig. 1 showing a modified structure.

Figure 3:
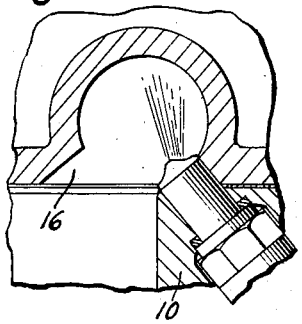
Figure 2:
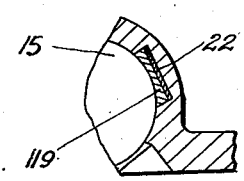
Figure 4:
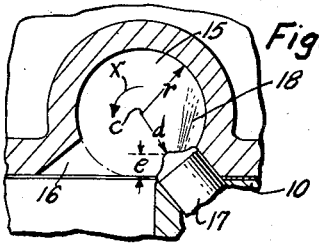

Fig. 3 is a partial section through an internal combustion engine similar to Fig. 1 illustrating a modification thereof, and Fig. 4 is a similar sectional view of still another modification.

My improved internal combustion engine of the diesel type comprises a cylinder 10, a piston 11 reciprocably mounted therein, a cylinder head 12, and a fuel injection nozzle 17. The piston 11 is shown in its upper dead center position, its plane end face confining a narrow flat compression space 13 with the flat bottom of the cylinder head 12. Both the cylinder and the cylinder head are provided with a water-cooling jacket in the conventional manner. Moreover, the cylinder head is provided with a rotund, preferably spherical, chamber 15 disposed substantially tangentially to the plane bottom surface of the head 12 and with a passageway 16 establishing a communication between the compression space 13 of the cylinder and the chamber 15. The passageway 16 extends substantially tangentially to the chamber 15 so as to cause the air entering the chamber 15 through the passageway 16 during the compression stroke of the piston 11 to form a vortex indicated by the arrow x. Preferably, the vortex chamber 15 is disposed laterally of a pair of valves not shown with which the cylinder head 12 is equipped for the admission of combustion air into the cylinder and for the exhaust of the combustion gases therefrom. A dash-dotted line 14 indicates a plane in which the axes of the pair of valves are located, such plane extending at right angles to the drawing. Hence, it will appear that the vortex chamber is located laterally above the cylinder space, and that the passageway 16 connecting the vortex chamber 15 with the compression space 13 is inclined, its axis being indicated by the dash-dotted line 21.

It will be noted from Fig. 1 that the axis 21 is spaced from the center of the chamber 15 and extends at an acute angle to the axis of the cylinder 10.

A fuel injection nozzle 17 is so mounted as to issue a jet 18 of fuel upon the wall of the vortex chamber 15 at an acute angle thereto, said jet being directed substantially in the direction of the air flow in the vortex, that is to say in the direction of the arrow x. For such purpose, the fuel injection nozzle 17 is mounted in an inclined bore of the cylinder 10 and projects through a bore of the cylinder head 12 into the vortex chamber 15 closely adjacent to the passageway 16. The bore thus provided both in the cylinder and the cylinder head intersects at an acute angle the plane bottom surface of the cylinder head fitted upon the cylinder and terminates in close proximity to the passageway 16.

In a preferred embodiment of my invention the jet 18 comprises all of the fuel injected, as illustrated in Fig. 4. Alternatively, however, the fuel injection nozzle may be provided with one or more additional ports to spray part of the fuel towards the center of chamber 15 transversely to the passageway 16, as indicated at 20 in Fig. 1.

The fuel injected in the direction of the arrow x in form of the jet 18 upon the region 19 of the wall of the chamber 15 will be spread on the wall of the chamber so as to form a thin layer thereon which subsequently will be partly or entirely vaporized. The vapor will be carried along by and distributed in the air by the vortex. It will be noted that in all of the embodiments of my invention described hereinabove the distance e of the tip of the nozzle from the cylinder of the engine is shorter than the distance d of the tip of the nozzle from the center C of the chamber 15. Moreover it will be noted that the radius r of the chamber 15 is larger than the distance d and that the spherical chamber 15 is disposed substantially tangentially to the bottom surface of the cylinder head. When the fuel injection commences, an extremely high temperature is abruptly produced near the tip of the nozzle and the consequent sudden expansion of the gases could interfere with the desired expulsion of the gases from the chamber into the cylinder unless the location of the point from which the fuel jet or jets is or are issued were chosen in an appropriate manner. Experiments have shown that the location of such point just described ensures a maximum efficiency. As the distance between the nozzle opening and the region 19 is comparatively short, and since the fuel globules constituting the jet 18 will be carried along by the stream of air entering the vortex chamber 15 through the passageway 16, the majority of the fuel globules will reach the region 19 of the wall in liquid condition. As a result, the combustion of the injected fuel is somewhat retarded and distributed over a longer period of time, whereby a smoother operation of the diesel engine will be attained. It is highly desirable, therefore, that the distance between the nozzle and the region 19 be comparatively short. For this reason, the point from which the fuel is injected is located within the chamber 15 eccentrically at a close distance from the wall of the chamber 15.

The jet 20 which extends transversely to the flow of air through the passageway 16 towards the center of the chamber and the opposed wall portions of the latter will carry the fuel globules into the core of the vortex for immediate combustion. If desired, the nozzle ports forming the jets 18 and 20 may be replaced, as shown in Fig. 3, by a single port so shaped as to produce a wide angle spray causing part of the fuel to be spread on the wall of the vortex chamber adjacent to the injection nozzle and to atomize the balance of the fuel for immediate combustion in the central portion of the vortex.

From the foregoing description it will appear that the vortex chamber in the cylinder head and the fuel injection nozzle are so relatively disposed that the fuel is sprayed in the direction of the air vortex in substantially liquid condition at an acute angle upon the wall of the vortex chamber and is subsequently distributed in vaporized condition by the air vortex over the air contents thereof. Preferably, the fuel injection nozzle is disposed adjacent to the cylinder in inclined position projecting into the vortex chamber from below near the passageway 16. The region 19 on which the liquid fuel is spread is effectively water-cooled.

While it has been proposed prior to my invention to spray the fuel at an acute angle upon the wall of a vortex chamber, such vortex chamber was located within the piston. My invention differs from such prior art by the absence of any vortex chamber in the piston. Therefore, I may use a simple piston having a flat plane end wall which results in more favorable thermal stresses of the piston end wall. The provision of the vortex chamber in the cylinder head offers the advantage that the walls thereof may be effectively cooled by water or by another suitable medium.

In the embodiment shown the region 19 of the wall of the vortex chamber on which all of the fuel or a major portion thereof is sprayed is integral with the remaining portions of the wall. If desired, however, the region 19 may be formed by a special insert. That is shown in Fig. 2 in which such insert 119 constitutes the region impinged by the jet 18. The insert 119 is inserted in an internal recess of the wall of chamber 15 and is insulated from the bottom of such recess by a disk 22 of a suitable heat-insulating material.

While all of the fuel to be injected may be sprayed upon the region 19 or the insert 119 for subsequent vaporization, a substantial part of the liquid may be injected transversely or at an angle to the stream of air entering the chamber 15 through the passageway 16, whereby such part of the fuel will be immediately ignited and burned. In this manner, a more even distribution of the fuel in the air may be attained.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Internal combustion engine of the Diesel type comprising a cylinder, a piston reciprocably mounted therein, a cylinder head provided with a spherical chamber disposed substantially tangentially to the bottom surface of said cylinder head and with a passageway establishing a communication between the internal space of said cylinder and said chamber, the axis of said passageway being spaced from the center of said chamber and extending at an acute angle to the axis of said cylinder so as to cause the air entering said chamber through said passageway during the compression stroke of said piston to form a vortex, and a fuel injection nozzle mounted within said cylinder and said cylinder head and projecting into said chamber to issue a jet of fuel from a point located within said chamber between the center and the wall thereof adjacent to said cylinder and to said passageway in a direction away from the latter upon the wall of said chamber at an acute angle thereto, the distance of said point from the center of said chamber being shorter than the radius of said spherical chamber.

2. Internal combustion engine of the Diesel type comprising a cylinder, a piston reciprocably mounted therein, a cylinder head mounted on said cylinder and provided with a spherical chamber disposed substantially tangentially to the bottom surface of said cylinder head and with a passageway establishing a communication between the internal space of said cylinder and said chamber, the axis of said passageway being spaced from the center of said chamber and projecting at an acute angle to the axis of said cylinder so as to cause the air entering said chamber through said passageway during the compression stroke of said piston to form a vortex, said cylinder head being further provided with a cooling jacket for said spherical chamber, and a fuel injection nozzle mounted to issue a jet of fuel from a point located within said chamber between the center and the wall thereof adjacent to said cylinder and to said passageway in a direction away from the latter upon a region of the internal wall of said chamber at an acute angle thereto, said region being so disposed with respect to said cooling jacket as to be effectively water-cooled, the distance of said point from the center of said chamber being shorter than the radius of said spherical chamber.

3. Internal combustion engine of the Diesel type comprising a cylinder, a piston reciprocably mounted therein, a cylinder head provided with a spherical chamber disposed substantially tangentionally to the bottom surface of said cylinder head and with a passageway establishing a communication between the internal space of said cylinder and said chamber, the axis of said passageway being spaced from the center of said chamber and extending at an acute angle to the axis of said cylinder so as to cause the air entering said chamber through said passageway during the compression stroke of said piston to form a vortex, and a fuel injection nozzle mounted to spray all of the fuel on the wall of said chamber at an acute angle thereto in the direction of the air-flow in said vortex from a point located within said chamber excentrically at a close distance from said wall and from said cylinder, the distance of said point from the center of said chamber being shorter than the radius of said spherical chamber.

4. Internal combustion engine as claimed in claim 2 in which said cylinder head has a plane bottom surface fitted upon said cylinder, the latter and said cylinder head being provided with a bore intersecting said surface at an acute angle and terminating in said spherical chamber in close proximity to said passageway, said bores accommodating said fuel injection nozzle.

5. Internal combustion engine as claimed in claim 2 in which said fuel injection nozzle is constructed to issue a jet of fuel substantially from said point toward the center of said chamber transversely to said passageway.

References Cited in the file of this patent

UNITED STATES PATENTS

| 2,061,826 | Bremser | Nov. 24, 1936 |
| 2,169,381 | Chapman | Aug. 15, 1939 |
| 2,204,068 | Chapman | June 11, 1940 |

FOREIGN PATENTS

| 340,069 | Great Britain | Dec. 24, 1930 |
| 400,173 | Great Britain | Oct. 12, 1933 |
| 486,208 | Great Britain | June 1, 1938 |
| 638,257 | Germany | Nov. 12, 1936 |